Oct. 3, 1944. A. G. HERRESHOFF ET AL 2,359,555
COUPLING
Filed Oct. 30, 1941
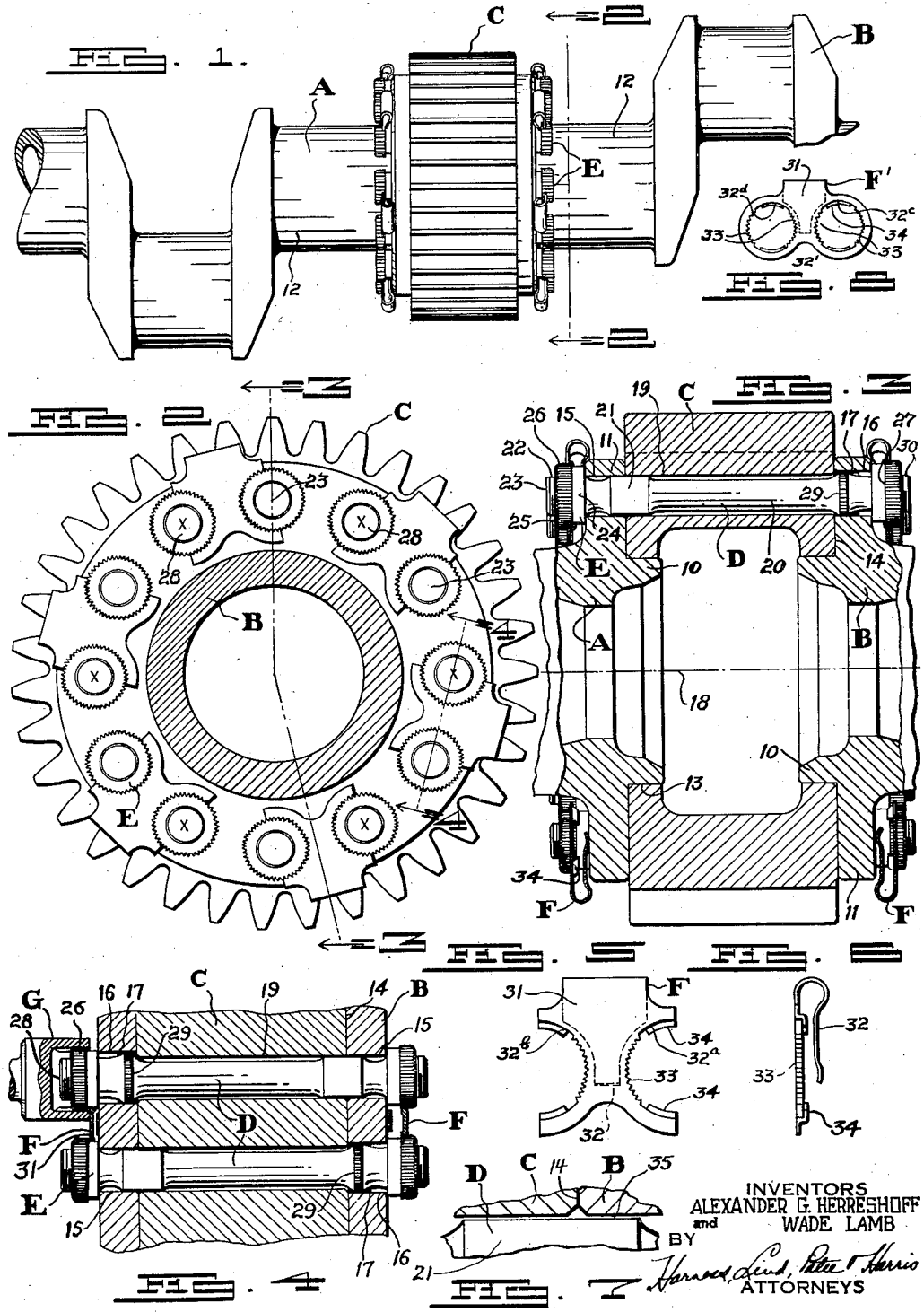
INVENTORS
ALEXANDER G. HERRESHOFF
and WADE LAMB
BY
ATTORNEYS Patented Oct. 3, 1944

2,359,555

UNITED STATES PATENT OFFICE 2,359,555

COUPLING

Alexander G. Herreshoff, Grosse Pointe, and Wade Lamb, Detroit, Mich., assignors to Chrysler Corporation, Highland Park, Mich., a corporation of Delaware Application October 30, 1941, Serial No. 417,170

16 Claims. (Cl. 287—52.07)

This invention relates to couplings and refers more particularly to improvements in the assembly and fastening together of parts of mechanisms, devices, machines, and machine elements. Our invention, in its more limited aspects, relates particularly to engine crankshafts and provides an improved crankshaft assembly and fastening means for the parts thereof.

One object of our invention is to provide an improved assembly of parts held together under high stress in conjunction with means accommodating accuracy in obtaining the desired degree of stress.

Another object is to provide improved locking means for fasteners of assemblies as aforesaid.

A further object is to provide a coupling embodying stressed fasteners so arranged as to guard against subjecting the fasteners to a twisting load during assembly of the coupling.

An additional object is to provide an improved crankshaft assembly embodying a power take-off gear.

Further objects and advantages of our invention will be more apparent as this specification progresses, reference being had to the accompanying drawing illustrating the principles of our invention and in which:

Fig. 1 is an elevational view of a portion of our assembled crankshaft.

Fig. 2 is a transverse sectional elevational view taken as indicated by line 2—2 of Fig. 1.

Fig. 3 is a longitudinal sectional view taken as indicated by line 3—3 of Fig. 2.

Fig. 4 is a detail sectional view taken as indicated by line 4—4 of Fig. 2.

Fig. 5 is a side elevational view of one of the locking devices as seen in Fig. 2.

Fig. 6 is a side elevational view of the Fig. 5 locking device.

Fig. 7 is an enlarged view of a dowel portion of one of the fastener studs.

Fig. 8 is a view similar to Fig. 5 but showing a modification.

Referring to the drawing we have illustrated our invention in the form of a crankshaft assembly, this assembly comprising the crankshaft portions A and B fastened together through the medium of a power take-off gear C. Component parts of a variety of other devices may be assembled together within keeping of the broader phases of our invention.

Each crankshaft portion A and B terminates inwardly of the assembly in an annular flange 10 extending longitudinally of the assembly or axially of the crankshaft, and an annular flange 11 extending transversely outwardly from an adjacent crankshaft bearing portion 12. The gear C has an axial opening 13 for seating on flanges 10 and a flat wall 14 at each end of the gear for frictionally engaging the inner face of an adjacent flange 11.

Each flange 11 is formed with a series of circumferentially spaced axially extending cylindrical openings 15 therethrough. These openings 15 are preferably even in number and they are located uniformly around each flange 11 so that each is spaced the same distance from the circumferentially adjacent opening. Each flange 11 is also formed with a second series of circumferentially spaced axially extending cylindrical openings 16 therethrough, the inner end portion of each of these openings having internal serrations 17. The openings 16 are also preferably even in number equal to the number of openings 15 and they are located uniformly around each flange 11 so that an opening 16 is spaced midway between an adjacent pair of openings 15, the axes of all openings 15 and 16 of each flange 11 lying at equal distances from the crankshaft axis 18. The openings 16 are relatively larger in diameter by a small amount than the openings 15.

The intermediate element C of the coupling is formed with a series of circumferentially spaced axially extending cylindrical openings 19 therethrough. These openings 19 are equal in number to the total number of openings 15 and 16 in either flange 11 and are so disposed as to axially align with the respective openings in flanges 11. The openings 19 are preferably equal in diameter to that of openings 15. In assembling the coupling parts A, B and C, each opening 15 of each flange 11 is axially aligned with an opening 19 and also with an opening 16 of the other flange 11 to form a set of aligned stud-receiving apertures. When so related the coupling then receives the tie means in the form of rods or studs D for holding the parts together.

The studs D are interchangeable, each comprising a central portion 20 of reduced diameter lying within an opening 19. Adjacent one end, each stud is formed with an enlarged pilot portion 21 which bridges a portion of gear C and flange 11 adjacent a face 14 thereby serving to axially align the coupling parts. Outwardly of the pilot portion 21, each stud is terminally threaded at 22 adjacent its end 23 to receive corresponding threads of a nut E each of which has an inner shank portion 24 and an outer portion 25 of enlarged diameter which is axially serrated at 26. The enlarged serrated portion 25 forms an annular shoulder 27 with the inner portion 24 of each nut E.

Adjacent the other end 28, each stud D is formed with an enlarged portion externally serrated at 29 to fit serrations 17, this stud end portion being likewise threaded at 30 to receive a nut E. In assemblying the studs D, the ends 23 of half of the total number of studs are inserted from one end of the assembly through each set of aligned openings 16, 19 and 15 and the remaining studs are similarly inserted from the opposite end of the assembly so that the ends 28 alternate circumferentially with the ends 23 at each end of the assembly. When assembled, each stud has its serrations 29 engaging serrations 17 of an opening 16, a pilot portion 21 serving to align the associated pairs of openings 15 and 19.

Locking means is provided for the nuts E comprising a plurality of devices F each of which comprises a main outer body portion 31 and an inner return-bent spring portion 32. The portion 32 is formed with a pair of oppositely opening cavities 32$^a$ and 32$^b$ in its opposite sides, each cavity comprising an intermediate serrated portion 33 and end flanges 34 which are offset inwardly of body portion 31 toward portion 32.

After the studs D have been inserted in place as aforesaid, the locking devices F are assembled along with nuts E. One manner of completing the assembly is as follows: A nut E is threaded on alternate bolts D at one flange 11 and then the locking devices F are associated with each of these nuts so as to bridge the gap toward the next adjacent bolt, the serrations 33 of each device F engaging the serrations 26 of the associated nut and flange 34 fitting behind shoulder 27. Each spring portion 32 engages the outer face of flange 11 biasing the nuts away from the flange. Then nuts E are threaded on the remaining studs D until their shoulders 27 engage the flanges 34 of the devices F. The nuts E and devices F are positioned in place at the other flange 11 in similar fashion so that each adjacent pair of studs D is bridged adjacent each flange 11 by a device F which engages the serrations of the nuts E mounted on the respective ends of such pair of studs. The assembly is then ready for the final tensioning of studs D as follows:

A serrated socket wrench G is then engaged with the serrations 26 of the nuts E which are mounted on the ends 28 of studs D. As the wrench G is so engaged it pushes body portion 31 of the associated device F inwardly so as to disengage serrations 33 and 26 leaving the wrench free to rotate the engaged nut E as illustrated in Fig. 4. As this nut is turned to obtain the desired degree of tension in the connected stud D, the stud is prevented from being subjected to a twisting stress because of the engaging serrations 29 and 17 located adjacent that end of the stud which is engaged by the wrench. As soon as the wrench is removed, the body 31 springs outwardly to engage serrations 33 of the pair of recesses with the two nuts E bridged by device F thereby preventing any rotation of these nuts from their desired positions. By first tightening the nuts at stud ends 28 adjacent one flange 11 and then tightening the nuts at stud ends 28 adjacent the other flange 11 it will be apparent that at all times one of the devices F is locking a pair of nuts for two studs including the stud whose nut is being tightened at its opposite end. This arrangement insures against any rotation of the nuts at one side of gear C while adjustments are made on the nuts at the other side. When one nut is being tightened on one stud, the nut on the opposite end of such stud serves as an abutment anchoring the stud lengthwise.

Our arrangement accommodates a fine adjustment of the nuts so as to stress all of the studs equally and to maintain the desired adjustment of the nuts without danger of loosening. By tightening only those nuts which are at the stud ends 28 adjacent serrations 29, less torque application is required for a desired tensioning of the studs than in instances where the nut on the remote end is tightened because in the latter instance a large shearing stress would be introduced in the stud whereas with our arrangement the stud is relieved of twisting load. In order to advise the operator of the proper stud ends for carrying out the assembly, the stud ends 28 may bear any identifying indicia such as the electric pencil mark "x" shown in Fig. 2, it being understood that the other studs which are unmarked in Fig. 2 are likewise marked at their opposite ends.

Because of the great degree of machining accuracy which is required in exactly aligning the studs with openings 16, 19 and 15 so that the dowel portion 21 of each stud exactly registers with and bears in openings 15 and 19, we prefer to provide a small clearance 35 for the dowel portions 21. In Fig. 7 this clearance is exaggerated for purpose of illustration and in practice would be in the neighborhood of around .005 of an inch total clearance for each dowel. Torsional vibrations in the crank shaft as well as fluctuations in the load at gear C makes it desirable to insure against any relative rotation between gear C and crankshaft portions A and B. Therefore the studs D are highly tensioned to provide sufficient friction between the abutting parts of gear C with crankshaft portions A and B to insure against any relative movement. If the assembly should lose this friction, for any unforeseen reason, then the dowel portions 21 will act to maintain the parts assembled until the defect is corrected.

The locking device F' in Fig. 8 is an alternative form of device F. The device F' has its cavities 32$^c$ and 32$^d$ of annular form instead of hemi-annular as in Fig. 5. Each cavity has two sets or regions serrated at 33. The device F' is otherwise as set forth for device F and the operation is identical.

We claim:

1. A coupling comprising, coaxial shaft sections, a gear disposed between said sections for frictional engagement therewith, and clamping means for urging said sections toward each other thereby to urge said sections into frictional engagement with said gear thereby to normally prevent rotation of said gear relative to said sections, said clamping means being so constructed and arranged as to accommodate, on failure of said frictional engagement, limited rotation of said gear relative to said sections.

2. A coupling comprising, coaxial shaft sections, a gear disposed between said sections, and a plurality of tie members extending between said sections and with clearance through said gear thereby to frictionally connect said gear with said sections so as to prevent rotation of said gear relative to said sections, such rotation being otherwise accommodated by reason of said clearance.

3. A coupling for securing together as an assembly a gear in position between coaxial shaft sections, comprising, a plurality of studs each having a connection adjacent one end thereof with one of said sections adapted to hold said studs against rotation relative to said one section and a piloting portion for said gear and the other of said sections adjacent the other end thereof.

4. A coupling for securing together as an assembly a gear in position between coaxial shaft sections each of which has a flange extending transversely of said axis for engagement with a side face of said gear, said flanges having a plurality of apertures extending therethrough with each aperture of one flange disposed in axial alignment with an aperture of the other flange, tieing means comprising a plurality of studs respectively extending through said axially aligned apertures, each of said studs having a serrated portion in engagement in one flange aperture, a piloting portion in engagement in the other flange aperture, an abutment adjacent the pilot portion and a tensioning nut adjacent the serrated portion.

5. A coupling for securing together as an assembly a gear in position between coaxial shaft sections, comprising, a plurality of studs each having a connection adjacent one end thereof with one of said sections adapted to hold said studs against rotation relative to said one section and a piloting portion for said gear and the other of said sections adjacent the other end thereof, certain of said studs having said non-rotating connection with one of said sections and the remainder of said studs having said non-rotating connection with the other of said sections.

6. A coupling for securing together as an assembly a gear in position between coaxial shaft sections, comprising, a pair of studs, one of said studs being provided with a non-rotatable connection adjacent one end thereof with one of said sections and a piloting portion for said gear and the other of said sections adjacent the other end thereof, the other of said studs being provided with a non-rotatable connection adjacent one end thereof with said other section and a piloting portion for said gear and said one section adjacent the other end thereof.

7. A coupling for securing together as an assembly a gear in position between coaxial shaft sections each of which has a flange extending transversely of said axis for engagement with a side face of said gear, each of said flanges having a pair of apertures extending therethrough such that each aperture of one flange is disposed in axial alignment with an aperture of the other flange, tieing means comprising a pair of interchangeable studs respectively extending through said aligned apertures and provided with a serrated portion adjacent one end thereof and a piloting portion adjacent the other end, said studs being directed in relatively opposite directions such that the serrated portion of one of said studs engages the aperture of one of said flanges while the serrated portion of the other of said studs engages the aperture of the other of said flanges and such that the piloting portion of one of said studs is disposed within the aperture of one of said flanges while the piloting portion of the other of said studs is disposed within the aperture of the other of said flanges.

8. A coupling for securing together as an assembly a gear disposed between coaxial shaft sections each having a portion thereof formed with a pair of apertures so arranged that the apertures of one section-portion are respectively aligned with the apertures of the other section-portion, comprising; a pair of studs respectively extending through the aligned apertures of said section-portions, one of said studs being provided with a non-rotatable connection adjacent one end thereof with the aperture of said one section-portion and a piloting portion adjacent the other end thereof for the aperture of said other section-portion, the other of said studs being provided with a non-rotatable connection adjacent one end thereof with the aperture of said other section-portion and a piloting portion adjacent the other end thereof for the aperture of said one section-portion, a pair of nuts bearing on said one section-portion and respectively threadedly engaging one end of said studs, a second pair of nuts bearing on said other section-portion and respectively threadedly engaging the other end of said studs, and releasable locking means bridging each of said pairs of nuts and operating to prevent relative rotation between each of said pairs of nuts.

9. A coupling for securing together as an assembly a gear disposed between coaxial shaft sections each of which is provided with a flange extending transversely of said axis and each flange being provided with a pair of apertures extending therethrough such that each aperture of one flange is disposed in axial alignment with an aperture of the other flange, said gear being disposed between said flanges and having a pair of apertures respectively aligned with said aligned apertures of the flanges, comprising, a pair of interchangeable studs respectively extending through said aligned apertures of said gear and sections and provided with a serrated portion adjacent one end thereof and a piloting portion adjacent the other end, said studs being directed in relatively opposite directions such that the serrated portion of one of said studs engages the aperture of said one flange while the serrated portion of the other of said studs engages said other flange and such that the piloting portion of one of said studgs is disposed within aligned apertures of said gear and said one flange while the piloting portion of the other of said studs is disposed within the other aligned apertures of said gear and said other flange, a pair of nuts bearing on said one flange and respectively threadedly engaging one end of said studs, a second pair of nuts bearing on said other flange and respectively threadedly engaging the other end of said nuts, and releasable locking means bridging each of said pairs of nuts and operating to prevent relative rotation between each of said pairs of nuts.

10. A coupling according to claim 8; each of said nuts having a shank portion and a second portion of relatively enlarged diameter externally serrated and providing a shoulder adjacent said shank portion; each of said locking means comprising a member having an outer body portion and spring means portion engaging one of said section-portions for biasing said body portion outwardly therefrom, said body portion having a pair of oppositely opening cavities, each of said cavities having a portion internally serrated for engagement with the external serrations of one of the nuts of a pair bridged by the locking means and a second portion offset relative to said body portion for engagement with the shoulder of the last mentioned nut thereby limiting outward movement of said body portion by said spring means while accommodating inward springing movement of said body portion to release the internal serrations of said cavities from engagement with the external serrations of said bridged pair of nuts.

11. A coupling for securing together as an assembly a pair of outer members and a third member intermediate said pair, each of said members having a pair of openings so arranged that each opening of each member is aligned with an opening of the other two members thereby to provide two sets of tie-rod-receiving apertures each of which has a component opening in each of said members, comprising a tie-rod extending through one of said sets of apertures having a non-rotatable connection in the component opening of one of said outer members and a piloting portion bridging the component openings in said third member and the other of said outer members, a second tie-rod extending through the other of said sets of apertures having a non-rotatable connection in the component opening of said other outer member and a piloting portion bridging the component openings in said third member and said one outer member, an abutment on the first said tie-rod adjacent its said piloting portion and bearing on said other outer member, a nut threaded on the first said tie-rod adjacent its said non-rotatable connection for tensioning this tie-rod, an abutment on the second tie-rod adjacent its said piloting portion and bearing on said one outer member, and a nut threaded on the second tie-rod adjacent its said non-rotatable connection for tensioning this tie-rod.

12. A coupling according to claim 11, locking means bridging said tie-rods adjacent each of said outer members for preventing rotation of said nuts relative to said abutments.

13. A coupling for a plurality of parts comprising, a pair of tie-rods adapted to be tensioned for tieing said parts together, a serrated shouldered nut threaded on each of said tie-rods, and locking means comprising a body bridging said nuts, said body having serrated portions respectively engaging the serrations of said nuts, said body also having portions offset therefrom axially of said tie rods for engaging said shoulders of said nuts, and means biasing said body to engage said offset portions with the respective shoulders of said nuts, said biasing means accommodating displacement of said body portion axially of said tie-rods for releasing said serrated portions of said body portion from engagement with said nuts.

14. A coupling comprising, a pair of coaxial torque transmitting elements, and a third torque transmitting element intermediate said pair for frictional driving engagement therewith, a plurality of elongated members connecting said elements, said members extending through openings in each of said elements with clearance in said third element to accommodate limited rotation of said third element relative to said pair of elements, said members including means so arranged and constructed as to clamp said third element between said pair of elements upon tensioning of said members, and said members being sufficiently tensioned whereby the frictional grip of said pair of elements upon said third element is adequate to accommodate the torque load to be transmitted between said elements without producing relative rotation between said elements and transverse shear in said members.

15. A coupling as claimed in claim 14, wherein the elongated members have an abutment with one of said pair of elements, a connection with the other of said pair of elements adapted to hold said members from rotation, and a tensioning nut threadedly secured thereto and abutting said element having said connection.

16. A nut locking member for coupling tie-rods comprising, a body portion having a pair of spaced apart internally serrated recesses, an end flange projecting within each recess and outwardly offset from one face of said body portion, and a bent portion resiliently connected to said body portion and overlying the face thereof from which said end flanges are offset.

ALEXANDER G. HERRESHOFF.
WADE LAMB.